United States Patent
Nakamura et al.

(10) Patent No.: US 6,512,339 B2
(45) Date of Patent: Jan. 28, 2003

(54) CRT DISPLAY DEVICE

(75) Inventors: Yoshitomo Nakamura, Tokyo (JP); Haruo Shigematsu, Tokyo (JP); Akinori Heishi, Tokyo (JP); Hironobu Yasui, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/951,415

(22) Filed: Sep. 14, 2001

(65) Prior Publication Data

US 2002/0153841 A1 Oct. 24, 2002

(30) Foreign Application Priority Data

Apr. 18, 2001 (JP) ......................................... 2001-119450

(51) Int. Cl.⁷ .................................................. G09G 1/04
(52) U.S. Cl. .................. 315/383; 315/403; 315/368.13; 315/368.16; 315/16; 348/678; 348/683; 348/687
(58) Field of Search .............................. 315/1, 3, 5.19, 315/5.34, 16, 368.13, 368.15, 368.16, 370, 371, 382, 383, 403; 348/325, 327, 678, 683, 687, 805

(56) References Cited

U.S. PATENT DOCUMENTS

| | | | | |
|---|---|---|---|---|
| 4,630,100 A | * | 12/1986 | DelSignore et al. | ........ 348/701 |
| 4,771,216 A | * | 9/1988 | Blacker et al. | ................ 315/15 |
| 4,871,949 A | * | 10/1989 | Abramson | ................... 313/409 |
| 5,182,492 A | * | 1/1993 | Chen | ........................... 313/414 |
| 5,382,883 A | * | 1/1995 | Chen et al. | .................. 313/409 |
| 5,396,257 A | * | 3/1995 | Someya et al. | .............. 345/1.1 |
| 5,555,026 A | * | 9/1996 | Lee | ............................. 348/380 |
| 5,585,691 A | * | 12/1996 | Washburn | ................... 313/411 |

* cited by examiner

Primary Examiner—Haissa Philogene
(74) Attorney, Agent, or Firm—Birch, Stewart, Kolasch & Birch, LLP

(57) ABSTRACT

In a CRT display device including a CRT (MM tube) having brightness higher than that in the background-art CRT, it is an object of the present invention to improve contrast and prevent conspicuous recognition of noises. A video signal modulation circuit (10) modulates a video signal (9) (first video signal) into a second video signal having a signal level in an area of low gradation level lower than a signal level of the first video signal. A cathode bias voltage source (7) generates a driving voltage on the basis of the second video signal. It is therefore possible to keep the driving voltage in the area of low gradation level low and reduce brightness in the area of low gradation level of a CRT (1). As a result, noises of an image in the area of low gradation level are not conspicuously recognized and a contrast value is increased, resulting in improvement in image quality.

4 Claims, 6 Drawing Sheets

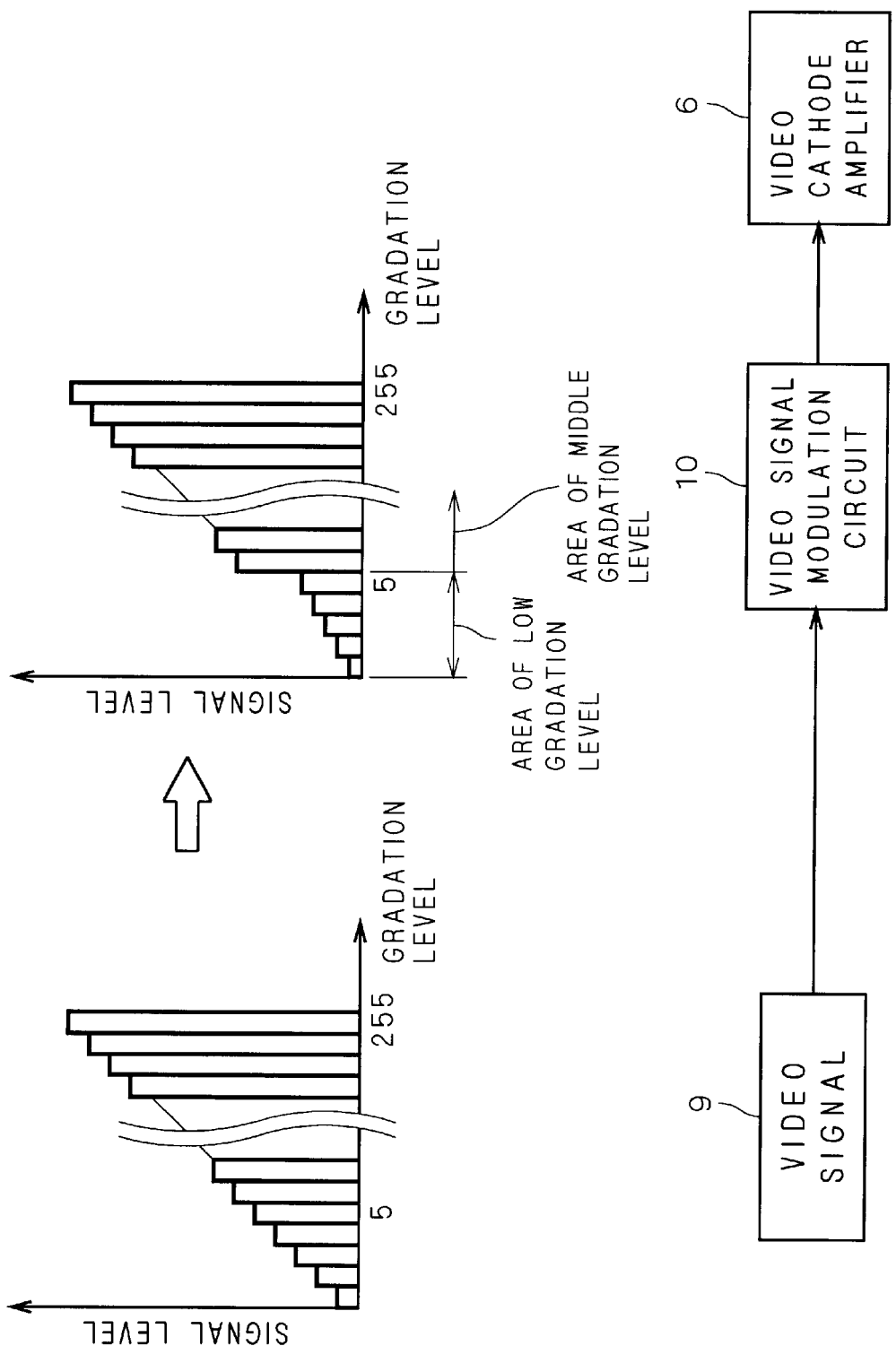
F I G . 2

CRT DISPLAY DEVICE

BACKGROUND OF THE INVENTION

1. Field of the Invention

The present invention is directed to a CRT display device using a cathode-ray tube.

2. Description of the Background Art

FIG. 4 is a block diagram schematically illustrating a CRT display device conventionally used in the background art. The reference numeral 1 represents a CRT. As shown in FIG. 4, the CRT 1 has an electron gun including a cathode 2 for emitting electrons, a first electrode G1, a second electrode G2, a third electrode G3, an anode 3 and the like. The first electrode G1, the second electrode G2 and the third electrode G3 of a cylindrical shape respectively having electron passing holes are arranged in the electron gun for drawing electrons from the cathode 2 and performing prefocusing, for example. The elements such as a focus electrode to be arranged subsequently to the third electrode G3 are omitted from FIG. 4 for the convenience of description. A flyback transformer (FBT) and a variable resistor are designated by the reference numerals 4 and 5, respectively. A video cathode amplifier, a cathode bias voltage source which generates a voltage for drawing electrons from the cathode 2, an adjusting/input circuit and a video signal to be inputted to the CRT display device are designated by the reference numerals 6, 7, 8 and 9, respectively.

Among voltages to be inputted from the cathode bias voltage source 7 to the cathode 2, a voltage for permitting a current to start flowing from the cathode 2 is called as a cutoff voltage (bias voltage for display in black). Considering the cutoff voltage to be 0 V, a voltage further inputted to the cathode 2 is called as a driving voltage.

The CRT display device is generally provided with brightness adjustment function and contrast adjustment function. The brightness adjustment function is intended, according to user's needs, to adjust a black level of an image and a level at which a screen starts to emit light. Normally, the level of the bias voltage for display in black, namely, the level of the cutoff voltage of the signal defined by the video signal 9 and to be applied to the cathode 2, is changed to perform the brightness adjustment function. The change in level of the cutoff voltage is controlled by adjusting potential difference between the cathode 2 and the first electrode G1. The adjusting/input circuit 8, intended to control the cutoff voltage, is composed of a volume resistor, a D/A converter and a microcomputer, for example.

The contrast adjustment function is intended to adjust, according to the user's needs, the ratio in brightness between a darkest portion and a brightest portion of a screen. Normally, the amplitude of the signal defined by the video signal 9 and to be applied to the cathode 2, more particularly, the driving voltage generated from the cathode bias voltage source 7, is changed to perform the contrast adjustment function.

Next, the operations of the CRT display device will be described in reference to FIG. 4. The video cathode amplifier 6 amplifies the video signal 9. The amplified video signal 9 is converted into a cathode bias signal according to the cutoff voltage controlled by the adjusting/input circuit 8. The cathode bias voltage source 7 generates the driving voltage on the basis of the cathode bias signal and applies the same to the cathode 2.

The flyback transformer 4 boosts and rectifies a horizontal flyback pulse generated at a horizontal deflection output circuit (not shown) to generate a high voltage of about 25 kV which is supplied to the anode 3. The high voltage generated by the flyback transformer 4 is divided by the variable resistor 5 having a resistance value of about 100 MΩ and supplied to the second electrode G2. The voltage applied to the second electrode G2 is controlled to thereby perform coarse adjustment of a point where emission of light starts by the electrons flowing into the anode 3 and falling on the screen, that is, adjustment of the screen. The voltages of the first electrode G1, the second electrode G2 and the third electrode G3 are respectively set to be 0 V, 500 V and 5.5 kV, for example.

The brightness of the screen of the CRT 1 is defined to be proportional to the value of a current falling on the screen, namely, to the amount of electron beams drawn from the cathode 2 and reaching the screen. That is, the value of the current drawn from the cathode 2 is large in a high brightness condition and small in a low brightness condition.

FIG. 5 is a graph showing the relation between the driving voltage and the value of the current drawn from the cathode 2 by the driving voltage in the CRT display device in the background art. A horizontal axis shows the driving voltage to be inputted to the cathode 2 and a vertical axis shows the value of the current drawn from the cathode 2. As shown in FIG. 5, when the driving voltage is lowered, the value of the current drawn from the cathode 2 is decreased. When the driving voltage is raised, the value of the current drawn from the cathode 2 is increased. That is, the brightness of the screen of the CRT 1 is increased accompanied by the raise in driving voltage.

In recent years, a CRT display device has been desired to show improvement in brightness and resolution. Due to this, development of a multimedia tube (hereinafter referred to as MM tube) as a CRT having high brightness and high resolution has been desired. According to a triode structure of the CRT in the background art as described above, the driving voltage is raised to amplify the value of the current drawn from the cathode 2. Accompanied by the necessity of improvement in resolution of the CRT, however, a frequency of the signal Voltage defined by the video signal 9 to be inputted to the cathode 2, namely, a frequency of the driving voltage, is required to be very high. For this reason, capabilities of the video cathode amplifier 6 and the cathode bias voltage source 7 for generating the driving voltage are approaching their limits. The output of the driving voltage generated by the existing video cathode amplifier 6 and the cathode bias voltage source 7 is limited to be 45 V. It is difficult to obtain a driving voltage exceeding 45 V. In view of these circumstances, it results that the effort to obtain high brightness of the CRT display device in the background art by increasing the driving voltage is approaching its limit.

It may be possible to decrease voltages of the second and third electrodes G2, G3 and lower a cathode voltage during cutoff to obtain high brightness. However, this results in an increased spot diameter on the screen and deterioration in resolution.

As a countermeasure for these problems, a CRT display device has been suggested which suppresses increase in spot diameter on the screen and deterioration in an image quality while allowing electron rays of the amount approximately the same as the background-art CRT display device to be drawn by a driving voltage smaller than that in the background-art CRT display. device, to thereby obtain brightness of a level that is not allowed by the driving voltage in the background art.

Such CRT display device allows high brightness. On the other hand, it has also a disadvantage in that accompanied by improvement in sensitivity of an output current of the CRT to a driving voltage, noises of an image not conspicuously recognized during display with low gradation level in the background-art CRT display device are increased and become conspicuous.

SUMMARY OF THE INVENTION

A first aspect of the present invention is directed to a CRT display device, comprising: an electron gun having a cathode and first, second electrodes respectively including electron passing holes for drawing electrons from the cathode; and driving voltage generating means for generating a driving voltage for drawing electrons from the cathode, wherein a cathode voltage during cutoff ranges from 50 V to 80 V regarding a voltage of the first electrode as zero following conditions among a diameter of the electron passing hole of the first electrode, a thickness of the first electrode at the electron passing hole, a diameter of the electron passing hole of the second electrode, a thickness of the second electrode at the electron passing hole and a distance between the first, second electrodes are satisfied, thickness of first electrode at electron passing hole/ diameter of electron passing hole of first electrode ≦0.23;

distance between first, second electrodes/diameter of electron passing hole of second electrode ≦0.53; and thickness of second electrode at electron passing hole/ diameter of electron passing hole of second electrode ≦0.87, and the driving voltage in an area having a gradation level lower than a predetermined gradation level is kept low in order to keep brightness in the area of the gradation level lower than the predetermined gradation level lower than real brightness of a first video signal to be inputted to the CRT display device.

A second aspect of the present invention is directed to the CRT display device according to the first aspect, wherein the driving voltage is interpolated so that rapid change in voltage level at a boundary between the area of the gradation level lower than the predetermined gradation level and an area of a gradation level higher than the predetermined gradation level is suppressed.

A third aspect of the present invention is directed to the CRT display device according to the first aspect, further comprising signal converting means for converting the first video signal into a second video signal having a gradation level lower than a gradation level of the first video signal in the area of the gradation level lower than the predetermined gradation level, wherein the driving voltage generating means generates the driving voltage on the basis of the second video signal.

A fourth aspect of the present invention is directed to the CRT display device according to the third aspect, wherein the second video signal is interpolated so that rapid change in gradation level at a boundary between the area of the gradation level lower than the predetermined gradation level and an area of a gradation level higher than the predetermined gradation level is suppressed.

According to the CRT display device of the first aspect of the present invention, the driving voltage in the area of the gradation level lower than the predetermined gradation level is kept low in order to keep brightness in the area of the gradation level lower than the predetermined gradation level lower than the real brightness of the first video signal to be inputted to the CRT display device. As a result, noises of an image at a low brightness area conspicuously recognized in the CRT display device using the MM tube in the background art become inconspicuous. Further, as the difference in brightness level between the low brightness area and a high brightness area is enlarged, there occurs increase in contrast value and improvement in image quality.

According to the CRT display device of the second aspect of the present invention, in the CRT display device of the first aspect, the driving voltage is interpolated so that rapid change in voltage level at the boundary between the area of the gradation level lower than the predetermined gradation level and the area of the gradation level higher than the predetermined gradation level is suppressed. As a result, display of an image on the CRT is realized with a desired gradation level in the vicinity of this boundary and deterioration in image caused by the display with undesired gradation level is controlled.

According to the CRT display device of the third aspect of the present invention, in the CRT display device of the first aspect, the signal converting means is provided for converting the first video signal into the second video signal having a gradation level lower than the gradation level of the first video signal in the area of the gradation level lower than the predetermined gradation level and the driving voltage generating means generates the driving voltage on the basis of the second video signal. As a result, the driving voltage in the area of the gradation level lower than the predetermined gradation level is kept low and brightness in the area of the gradation level lower than the predetermined gradation level is kept lower than the real brightness of the first video signal to be inputted to the CRT display device. Therefore, noises of the image in the low brightness area conspicuously recognized in the CRT display device using the MM tube in the background art become inconspicuous. Further, as the difference in brightness level between the low brightness area and the high brightness area is enlarged, there occurs increase in contrast value and improvement in image quality.

According to the CRT display device of the fourth aspect of the present invention, in the CRT display device of the third aspect, the second video signal is interpolated so that rapid change in gradation level at the boundary between the area of the gradation level lower than the predetermined gradation level and the area of the gradation level higher than the predetermined gradation level is suppressed. As a result, rapid change in level of the driving voltage at this boundary is controlled, to thereby suppress rapid change in image at this boundary to be displayed on the CRT. Therefore, display of the image on the CRT is realized with a desired gradation level in the vicinity of this boundary and deterioration in image caused by the display with undesired gradation level is controlled.

It is therefore an object of the present invention to provide a CRT display device allowing electron rays of the amount approximately the same as the background-art CRT display device to be drawn by a driving voltage smaller than that in the background-art CRT display device, to thereby obtain brightness of a level that is not allowed by the driving voltage in the background art. It is also an object of the present invention to allow the CRT display device to be operative to prevent conspicuous recognition of noises and to improve contrast.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a view illustrating operations of a video signal modulation circuit of the CRT display device according to the first preferred embodiment of the present invention;

DESCRIPTION OF THE PREFERRED EMBODIMENTS

First Preferred Embodiment

Figure 1:
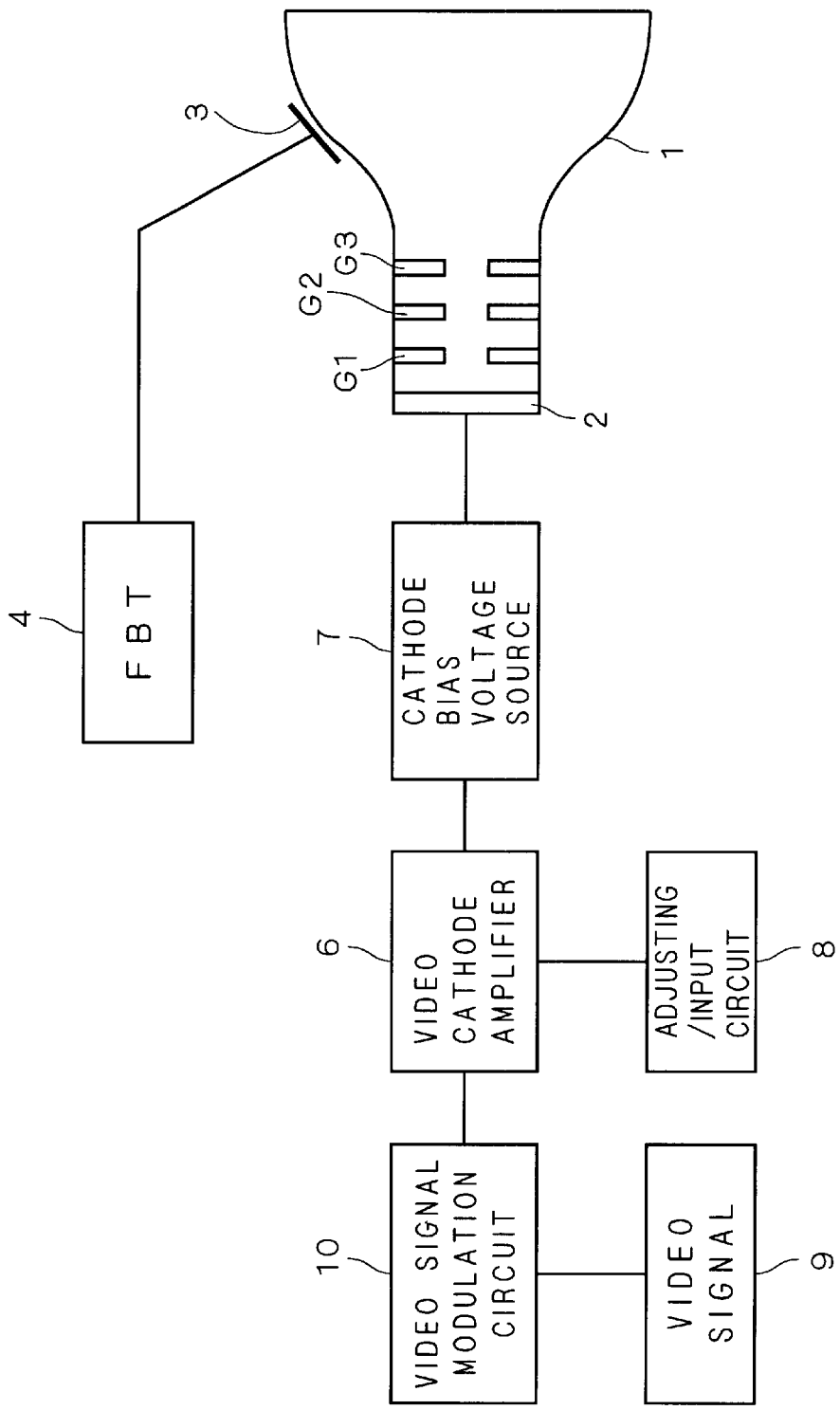
FIG. 1 is a block diagram schematically illustrating a CRT display device according to a first preferred embodiment of the present invention.
Figure 4:
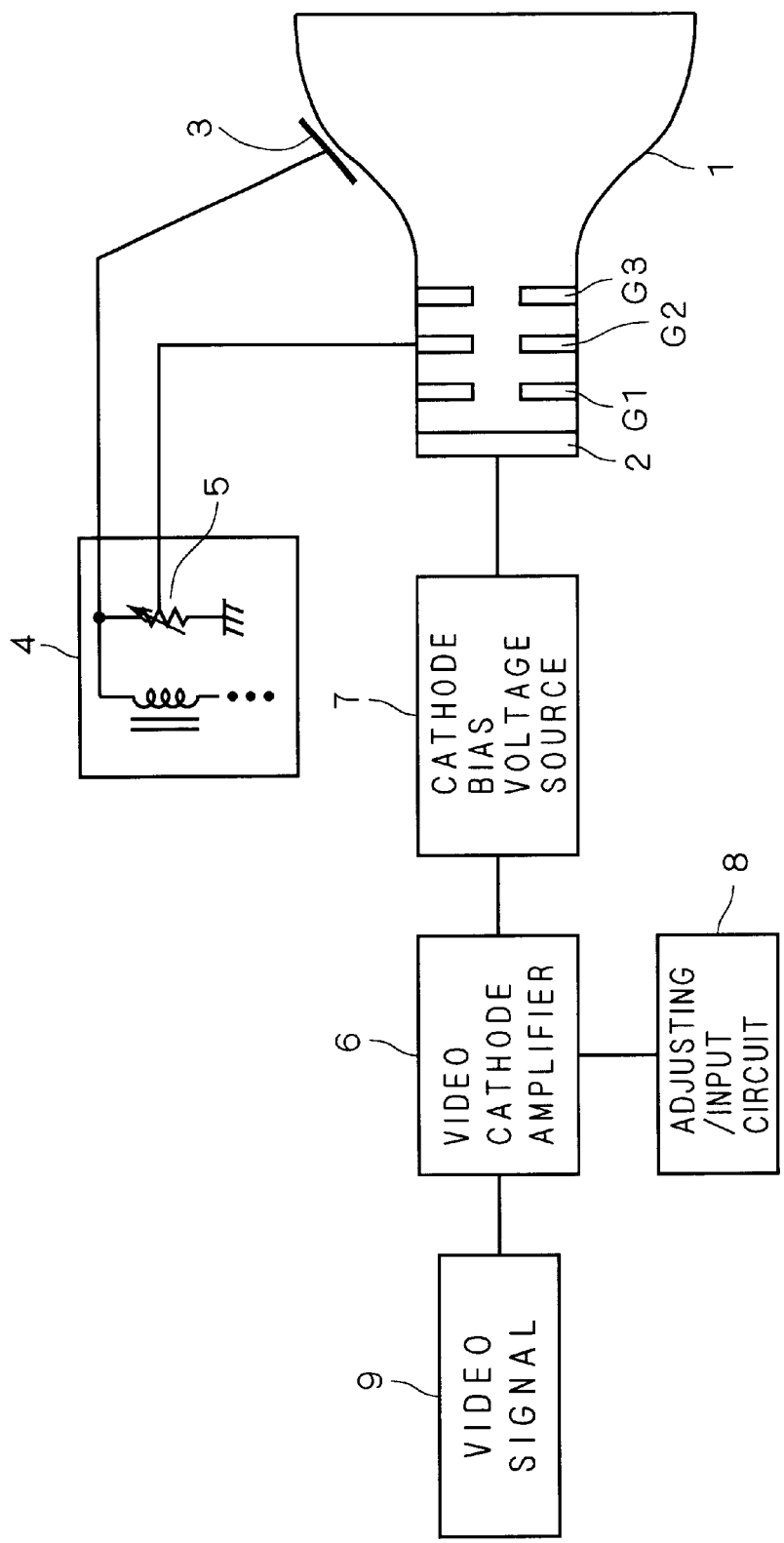
FIG. 4 is a block diagram schematically illustrating a CRT display device conventionally used in the background art.

FIG. 1 is a block diagram schematically illustrating a CRT display device according to the first preferred embodiment of the present invention. In FIG. 1, elements respectively having the same functions as those of the elements shown in FIG. 4 are designated by the same reference numerals and the detailed description thereof is omitted here. The reference numeral 1 represents a CRT as an MM tube. The CRT 1 has an electron gun including a cathode 2 for emitting electrons, a first electrode G1, a second electrode G2, a third electrode G3, an anode 3 and the like. The elements such as a focus electrode to be arranged subsequently to the third electrode G3 are also omitted from FIG. 1 for the convenience of description.

Parameters of a diameter of an electron passing hole of the first electrode G1, a thickness of the first electrode G1 at the electron passing hole, a diameter of an electron passing hole of the second electrode G2, a thickness of the second electrode G2 at the electron passing hole and a distance between the first, second electrodes G1, G2 respectively satisfy conditions follows:

thickness of first electrode G1 at electron passing hole/ diameter of electron passing hole of first electrode G1$\leq$0.23;

distance between first, second electrodes G1, G2/diameter of electron passing hole of second electrode G2$\leq$0.53; and thickness of second electrode G2 at electron passing hole/diameter of electron passing hole of second electrode G2$\leq$0.87

As will be described in detail later, the CRT 1 satisfying these conditions allows suppression of deterioration in spot diameter of an electron beam by means of a low driving voltage to maintain an image quality at the same level as in the CRT display device in the background art. It further raises a value of a current drawn from the cathode 2 by up to about 1.7 times as high as the value as obtained by the driving voltage in the background art. That is, the CRT 1 satisfying these conditions is a multimedia tube.

A flyback transformer (FBT), a video cathode amplifier, a cathode bias voltage source, an adjusting/input circuit and a video signal modulation circuit are designated by the reference numerals 4, 6, 7, 8 and 10, respectively. Further, the reference numeral 9 represents a video signal to be inputted to the CRT display device.

The detailed description of the multimedia tube will be given hereinafter. A numeric value as one of the indications showing a capability of a portion for drawing electrons of the CRT in relation to resolution of the CRT display device is called as emittance. Emittance is the value defined by a divergence angle of an electron after passing through the portion for drawing electrons of the CRT and a virtual width of object point. When compared under the current as drawn having the same value, a spot diameter obtained on the screen is generally increased accompanied by increase in emittance, to cause deterioration in resolution. Conversely, the spot diameter is decreased accompanied by decrease in emittance, resulting in improvement in resolution. The value of emittance used in the present specification and claims is obtained by simulation in which conditions are set to define the current as drawn to have a value of 300 $\mu$A. In this simulation, the value of emittance is calculated by multiplying a divergence angle and a width of object point that are determined without consideration of 5 percent of electron orbits in positions distant from a central axis among other electron orbits as obtained. The reason for disregarding 5 percent of electron orbits is that an outer surface of a spot on the screen formed by electrons in these 5 percent of orbits is dark and has low visibility, to bring about little effect on resolution.

As it is difficult to directly determine width of object point by measurement, the value of emittance is basically obtained by simulation. On the other hand, due to the fact that it is comparatively easy to determine divergence angle by measurement, the results of the measurement and simulation were compared. As a result, it was shown that if the second electrode G2 for simulation is defined to have a thickness larger than that of the second electrode G2 for measurement by about 10 percent, the divergence angles obtained from simulation and measurement virtually coincide with each other. For this reason, the value of emittance in the present specification and claims is a resultant of simulation that is performed after correcting the thickness of the second electrode G2.

The CRT in the background art described above has emittance of about 690 $\mu$m.rad. A CRT which may be required to display an image as a display monitor should have emittance of 690 $\mu$m.rad or less.

Based on simulation, a structure for a CRT suppressing increase in spot diameter of an electron beam on a screen, maintaining resolution, that is, maintaining emittance at a level of about 690 $\mu$m.mrad, lowering a cathode voltage during cutoff and obtaining brightness of the same level as that in the background art by a driving voltage smaller than that in the background art, namely, a structure for an MM tube has been developed using the background-art CRT structure.

As mentioned above, an increased amount of current can be drawn from the cathode 2 by means of the same driving voltage by lowering the cathode voltage during cutoff. On the other hand, as a modulation voltage of the cathode is 50 plus some volts including margin of adjustment, a cutoff voltage should be 50 plus some volts or more. This is because when the voltage of the cathode 2 is lower than the voltage of the first electrode G1, disadvantages such as decreased lifetime of the cathode may be caused by electrons incident on the first electrode G1.

In a conventional color CRT, the first electrode G1 and the second electrode G2 have voltages common among RGB. Therefore, dispersion in components and dispersion in assembly result in dispersion in cutoff voltage by some volts to 10 plus some volts. For this reason, a target value of the cutoff voltage is defined to be 65 V. The value of the cutoff voltage substantially ranges between 50 V and 80 V. The simulation described above was performed with the cutoff voltage of 65 V.

The simulation was performed in the background-art CRT structure employing the diameter of the electron passing hole of the first electrode G1, the thickness of the first electrode G1 at the electron passing hole, the diameter of the electron passing hole of the second electrode G2, the thickness of the second electrode G2 at the electron passing hole and the distance between the first, second electrodes G1, G2 as parameters.

As a result of the simulation, it was shown that the CRT satisfying the following conditions allows suppression of deterioration in spot diameter of an electron beam by means of a low driving voltage to maintain an image quality at the same level as in the CRT display device in the background art. It was further shown that such CRT raises the value of the current drawn from the cathode 2 by up to about 1.7 times as high as a value as obtained by the driving voltage in the background art. That is, the CRT satisfying the following conditional expressions is an MM tube.

thickness of first electrode G1 at electron passing hole/diameter of electron passing hole of first electrode G1≦0.23;

distance between first, second electrodes G1, G2/diameter of electron passing hole of second electrode G2≦0.53; and thickness of second electrode G2 at electron passing hole/diameter of electron passing hole of second electrode G2≦0.87

Figure 5:
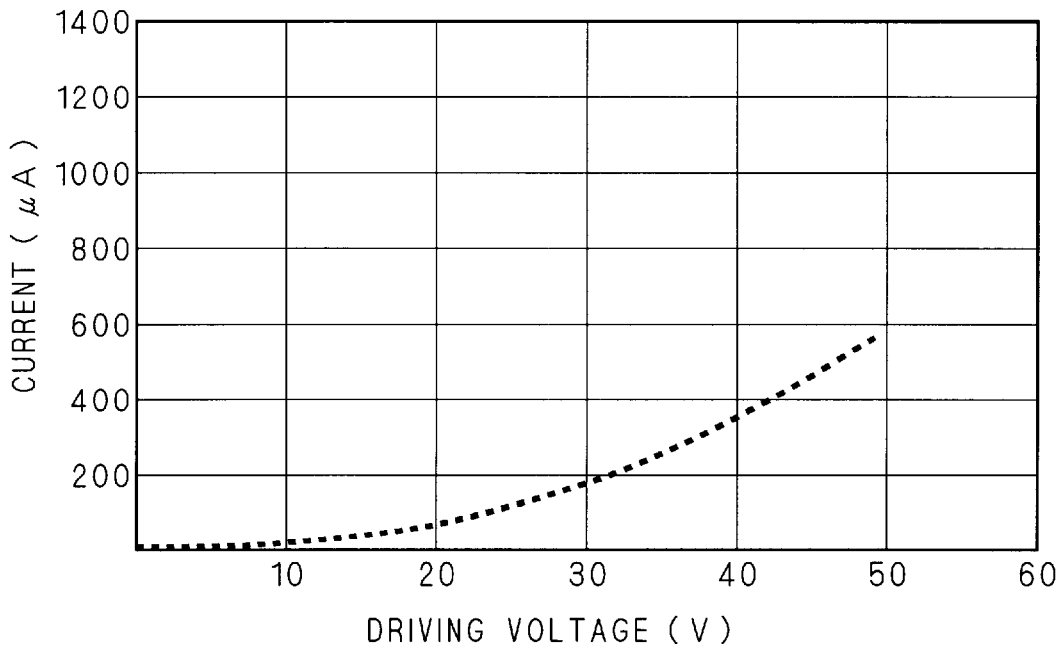
FIG. 5 is a graph showing the relation between a driving voltage and a value of a current drawn from a cathode by the driving voltage in the CRT display device in the background art.

For example, in the background-art CRT having characteristics shown in FIG. 5, the diameters of the electron passing holes of the first, second electrodes G1, G2 are 0.4 mm, the thickness of the first electrode G1 at the electron passing hole is 0.08 mm, the thickness of the second electrode G2 at the electron passing hole is 0.24 mm and the distance between the first, second electrodes G1, G2 is 0.25 mm. Voltages to be applied to the first and second electrodes G1 and G2 are 0 V and 400 V, respectively. In this structure, relations are established as follows:

thickness of first electrode G1 at electron passing hole/diameter of electron passing hole of first electrode G1≦0.2, distance between first, second electrodes G1, G2/diameter of electron passing hole of second electrode G2≦0.625; and thickness of second electrode G2 at electron passing hole/diameter of electron passing hole of second electrode G2≦0.6

That is, these relations do not satisfy the conditions of the MM tube obtained from the result of the simulation. Further, the cutoff voltage for operations is about 110 V. As shown in FIG. 5, a current drawn by the modulation voltage of 45 V is about 450 µA.

When the CRT has a structure including the diameter of the electron passing hole of the first electrode G1, the thickness of the first electrode G1 at the electron passing hole, the diameter of the electron passing hole of the second electrode G2, the thickness of the second electrode G2 at the electron passing hole and the distance between the first, second electrodes G1, G2 respectively being 0.3 mm, 0.065 mm, 0.44 mm, 0.38 mm and 0.23 mm, for example, the following relations are established that marginally satisfy the foregoing conditional expressions of the MM tube:

thickness of first electrode G1 at electron passing hole/diameter of electron passing hole of first electrode G1≈0.23;

distance between first, second electrodes G1, G2/diameter of electron passing hole of second electrode G2≈0.52; and thickness of second electrode G2 at electron passing hole/diameter of electron passing hole of second electrode G2≈0.86

Figure 6:
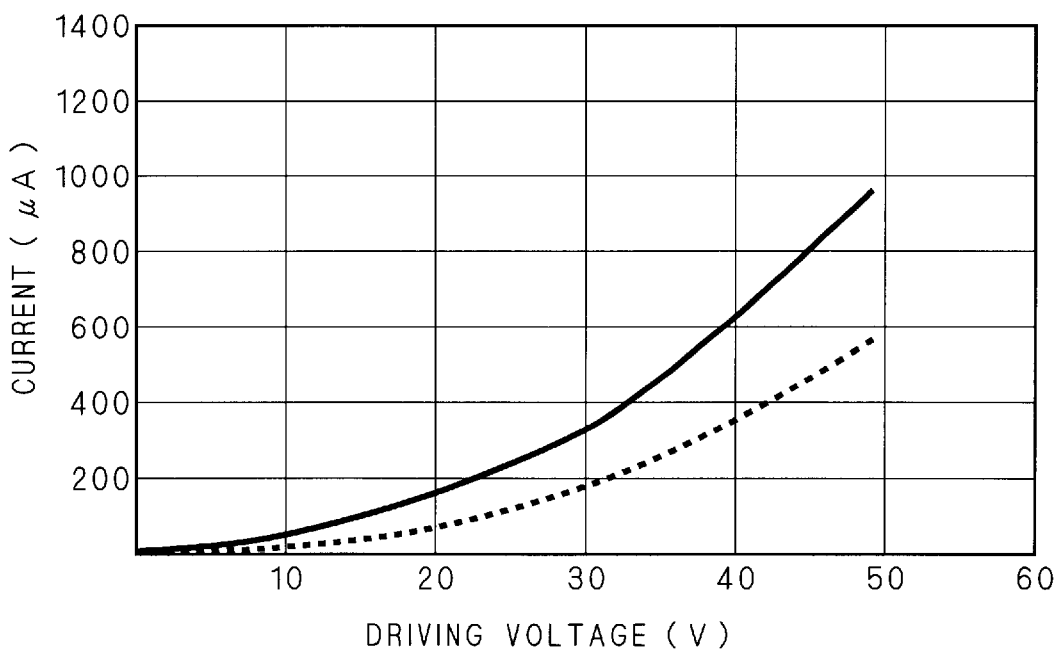
FIG. 6 is a graph showing the relation between a driving voltage and a value of a current drawn by the driving voltage in a CRT display device using an MM tube.

Defining the cathode voltage during cutoff to be 65 V (regarding voltage of the first electrode G1 as zero), such CRT, namely the MM tube, forms the relation between the driving voltage and the value of the current drawn from the cathode 2 by the driving voltage is shown by a solid line in the graph of FIG. 6. A dotted line in the graph of FIG. 6 represents the characteristics of the background-art CRT display device that are shown in the graph of FIG. 5. It is shown that the MM tube raises the value of the current by up to about 1.7 times as high as the value as obtained by the same modulation voltage in the background art. As described above, further, emittance of this MM tube is maintained at a level of about 690 µm.mrad or less. That is, resolution is maintained at the same level as that of the CRT in the background art.

It is further shown by the simulation that each value of the thickness of the first electrode G1 at the electron passing hole/the diameter of the electron passing hole of the first electrode G1, the distance between the first, second electrodes G1, G2/the diameter of the electron passing hole of the second electrode G2 and the thickness of the second electrode G2 at the electron passing hole/the diameter of the electron passing hole of the second electrode G2 has influence on emittance of the CRT. That is, it is shown that emittance is improved accompanied by decrease in each of these values.

Moreover, when the CRT has an alternative structure including the diameter of the electron passing hole of the first electrode G1, the thickness of the first electrode G1 at the electron passing hole, the diameter of the electron passing hole of the second electrode G2, the thickness of the second electrode G2 at the electron passing hole and the distance between the first, second electrodes G1, G2 respectively being 0.3 mm, 0.065 mm, 0.35 mm, 0.23 mm and 0.16 mm, for example, the following relations are established that satisfy the foregoing conditional expressions of the MM tube. This CRT also acquires the same characteristics as those shown by the solid line in the graph of FIG. 6.

thickness of first electrode G1 at electron passing hole/diameter of electron passing hole of first electrode G1≈0.22;

distance between first, second electrodes G1, G2/diameter of electron passing hole of second electrode G2≈0.46; and thickness of second electrode G2 at electron passing hole/diameter of electron passing hole of second electrode G2≈0.66

When the CRT has another alternative structure including the diameter of the electron passing hole of the first electrode G1, the thickness of the first electrode G1 at the electron passing hole, the diameter of the electron passing hole of the second electrode G2, the thickness of the second electrode G2 at the electron passing hole and the distance between the first, second electrodes G1, G2 respectively being 0.25 mm, 0.05 mm, 0.3 mm, 0.18 mm and 0.12 mm, for example, the following relations are established that satisfy the foregoing conditional expressions of the MM tube. This CRT also acquires the same characteristics as those shown by the solid line in the graph of FIG. 6.

thickness of first electrode G1 at electron passing hole/diameter of electron passing hole of first electrode G1≈0.20;

distance between first, second electrodes G1, G2/diameter of electron passing hole of second electrode G2≈0.40; and thickness of second electrode G2 at electron passing hole/diameter of electron passing hole of second electrode G2≈0.60

As understood from the results mentioned above, the CRT satisfying the foregoing conditional expressions of the MM tube allows suppression of deterioration in spot diameter of an electron beam by means of a low driving voltage to maintain an image quality at the same level as in thee background-art CRT display device. It further raises the value of the current drawn from the cathode 2 by up to about 1.7 times as high as the value as obtained in the background art by means of the same driving voltage.

That is, the MM tube allows suppression of deterioration in spot diameter of an electron by means of a low driving voltage to maintain an image quality at the same level as in the background-art CRT display device. It further keeps the level of the driving voltage required for drawing current from the cathode 2 at a level lower than that in the background art, to thereby obtain brightness of a high level that cannot be realized in the background art.

The MM tube realizes raise in value of the current against driving voltage by up to about 1.7 times as the value as obtained in the background art by means of the same driving voltage. Therefore, if the video signal in the background art is directly inputted to the display device including the MM tube, it follows that brightness having the level raised by up to about 1.7 times as high as that in the background art can be obtained.

Figure 7:
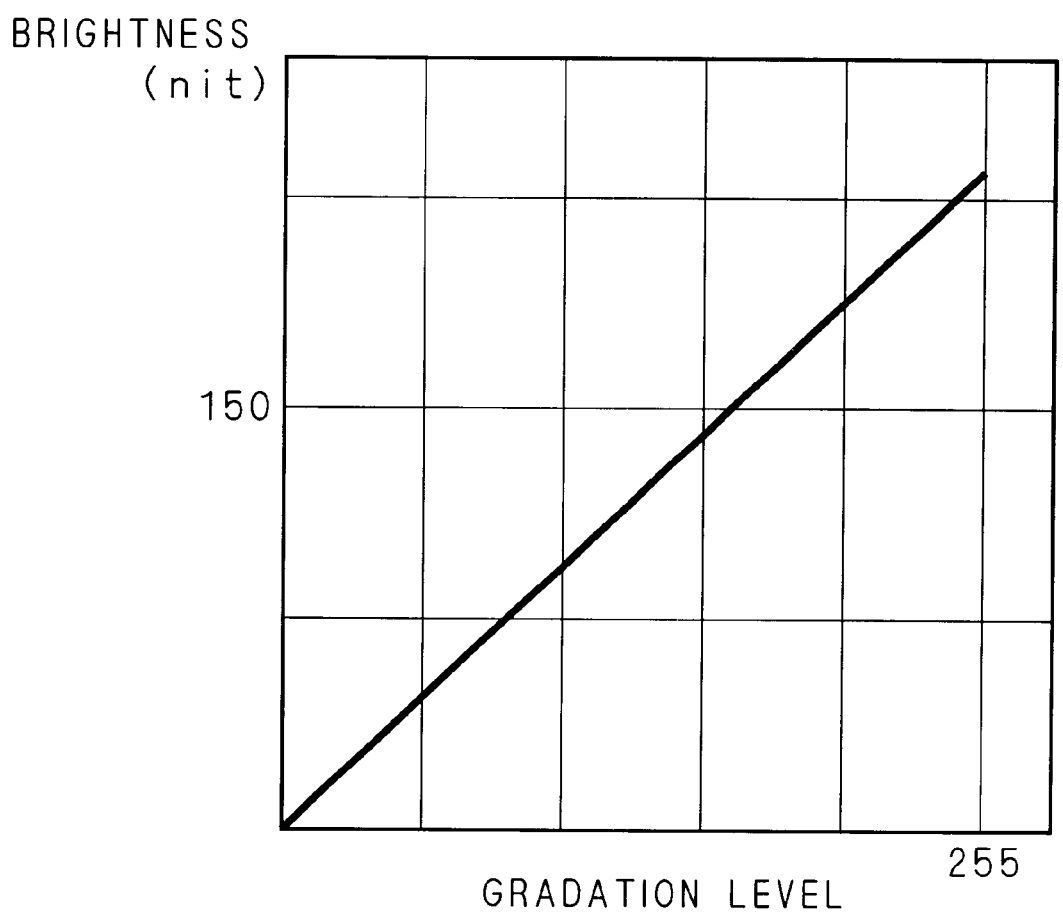
FIG. 7 is a graph showing the relation between a gradation level according to a video signal and brightness of the CRT display device in the background art.

FIG. 7 is a graph showing the relation between a gradation level according to the video signal 9 and brightness of the CRT display device in the background art. The driving voltage to be applied to the cathode 2 from the cathode bias voltage source 7 is so defined that the gradation level according to the video signal 9 to be inputted to the video cathode amplifier 6 and the brightness of the CRT display device are in proportion to each other as shown in FIG. 7. FIG. 7 shows that the background-art CRT has brightness of about 150 nit in white with the video signal of 8 bits (256-step gradation). In contrast, the MM tube has brightness of 260 nit that is 1.7 times as high as that of the background-art CRT.

As described above, the CRT display device changes the driving voltage to be supplied to the cathode to display an image. With the driving voltage of any level, the display device including the MM tube obtains brightness that is about 1.7 times as high as that in the background-art CRT display device. That is, the display device including the MM tube has brightness raised by up to 1.7 times as high as that of the background-art CRT display at any gradation level. For this reason, when an image of a device such as a DVD is displayed, an area displayed in black (area of low brightness) which is not conspicuously recognized with the driving voltage in the background art is approximated to the view in gray (not in black). This is because noises of an image in the area of low brightness, not conspicuously recognized under brightness of the background-art CRT display device, become conspicuous under brightness raised by up to about 1.7 times as high as that of the background-art CRT display device.

Regardless of brightness level, brightness is increased with the same ratio. Therefore, there is little change in contrast value that is determined by the equation of "contrast value=lowest brightness/(lowest brightness+highest brightness)". On the other hand, as the low brightness area is increased in brightness to a visible level, the CRT display device including the MM tube results in lowered quality of display as compared with the CRT display device in the background art.

As a countermeasure for these problems, the CRT display device including the MM tube according to the first preferred embodiment allows improvement in contrast and inconspicuousness of image noises in the low brightness area.

The operations of the CRT display device according to the first preferred embodiment will be described in reference to FIG. 1. The video signal 9 (referred to as a first video signal for convenience of description) is converted into a second video signal having a signal level in the area of low gradation level (black area) kept lower than the signal level of the first video signal in the same gradation level. The video cathode amplifier 6 amplifies the second video signal. The amplified second video signal is converted into a cathode bias signal according to the cutoff voltage controlled by an adjusting/input circuit 8. The cathode bias voltage source 7 generates a driving voltage on the basis of the cathode bias signal and applies the same to the cathode 2. That is, the cathode 2 of the CRT display device according to the first preferred embodiment receives the driving voltage defined on the basis of the second video signal.

FIG. 2 is a view illustrating the operations of the video signal modulation circuit 10. As shown by the left graph of FIG. 2, a signal level according to the video signal 9 (first video signal) to be inputted to the video signal modulation circuit 10 and a gradation level thereof are in proportion to each other. The video signal modulation circuit 10 modulates the first video signal into the second video signal having a signal level in the area of low gradation level kept lower than the signal level of the first video signal in the same gradation level as shown in the right graph of FIG. 2.

More particularly, the proportionality constant of the signal level to the gradation level in the area of low gradation level is defined to be lower than the proportionality constant of the signal level of the first video signal to the gradation level. FIG. 2 shows the example in which the video signal modulation circuit 10 reduces the proportionality constant of the signal level within the area of lower five levels of gradation of the first video signal to the gradation level to thereby modulate the first video signal into the second video signal and output the same. Here, the proportionality constant of the signal level of the second video signal in the areas other than the area of low gradation level, namely, the areas of middle gradation level and high gradation level, to the gradation level is maintained at the same level as that of the first video signal.

The example shown in FIG. 2 defines the area of low gradation level of the first video signal to be modulated by the video signal modulation circuit 10 to have lower five levels of gradation. However, operations of the video signal modulation circuit 10 should not be limited to this. They may be changed according to the contents to be displayed by the video signal 9.

As the operations of the video cathode amplifier 6 and the cathode bias voltage source 7 are controlled by the second video signal, it follows that the value of the driving voltage to be applied to the cathode 2 in the area of low gradation level, namely, in the low brightness area, is lowered.

Consequently, the brightness of the image in the low brightness area to be displayed on the CRT display device is controlled to a level lower than that of the CRT display device using the MM tube in the background art.

As a result, noises of the image in the low brightness area conspicuously recognized in the CRT display device using the MM tube in the background art become inconspicuous. As the difference in brightness level between the low brightness area and the high brightness is enlarged, further, there occurs increase in contrast value and improvement in image quality.

Noises of images resulted from sources of the images such as a DVD and CD can be made inconspicuous as well.

In the first preferred embodiment, the proportionality constant of the signal level to the gradation level in the area of low gradation level is defined to be lower than the proportionality constant of the signal level of the first video signal to the gradation level by the video signal modulation circuit 10. The first video signal is thereby converted into the second video signal. However, the method of converting the first video signal into the second video signal should not be limited to this. Another method of lowering the signal level to the gradation level in the area of low gradation level than the signal level of the first video signal to the same gradation level is applicable. In is clear that the same effects can be achieved by such method.

In the first preferred embodiment, further, the video signal modulation circuit 10 modulates the first video signal into the second video signal having a signal level in the area of low gradation level lower than the signal level of the first video signal in the same gradation level. The value of the driving voltage to be applied to the cathode 2 in the area of low gradation level is thereby lowered. However, the method of lowering the value of the driving voltage should not be limited to this. Another method of lowering the value of the driving voltage in the area of low gradation level is applicable. It is clear that the same effects can be achieved by such method.

Second Preferred Embodiment

According to the second video signal shown in FIG. 2, for example, there occurs great variation in signal level at the boundary between the area of low gradation level having a signal level lower than that of the first video signal and the other areas, namely, the areas of middle, high gradation levels. When the second video signal resulting in this variation is employed, the image according to the gradation level at this boundary is forced to be displayed without a desired gradation level. As such boundary exists in the area of relatively low gradation level, it follows that in the image having a large ratio of display in black with low gradation level such as a dark image (especially image at a night scene), impossibility of display with a desired gradation level becomes conspicuous and results in the problem.

As a countermeasure for this problem, the second preferred embodiment suppresses rapid change in signal level at the boundary between the signal level in the area of low gradation level and the signal level in the area of high gradation level according to the second video signal to be outputted from the video signal modulation circuit 10.

Figure 3:
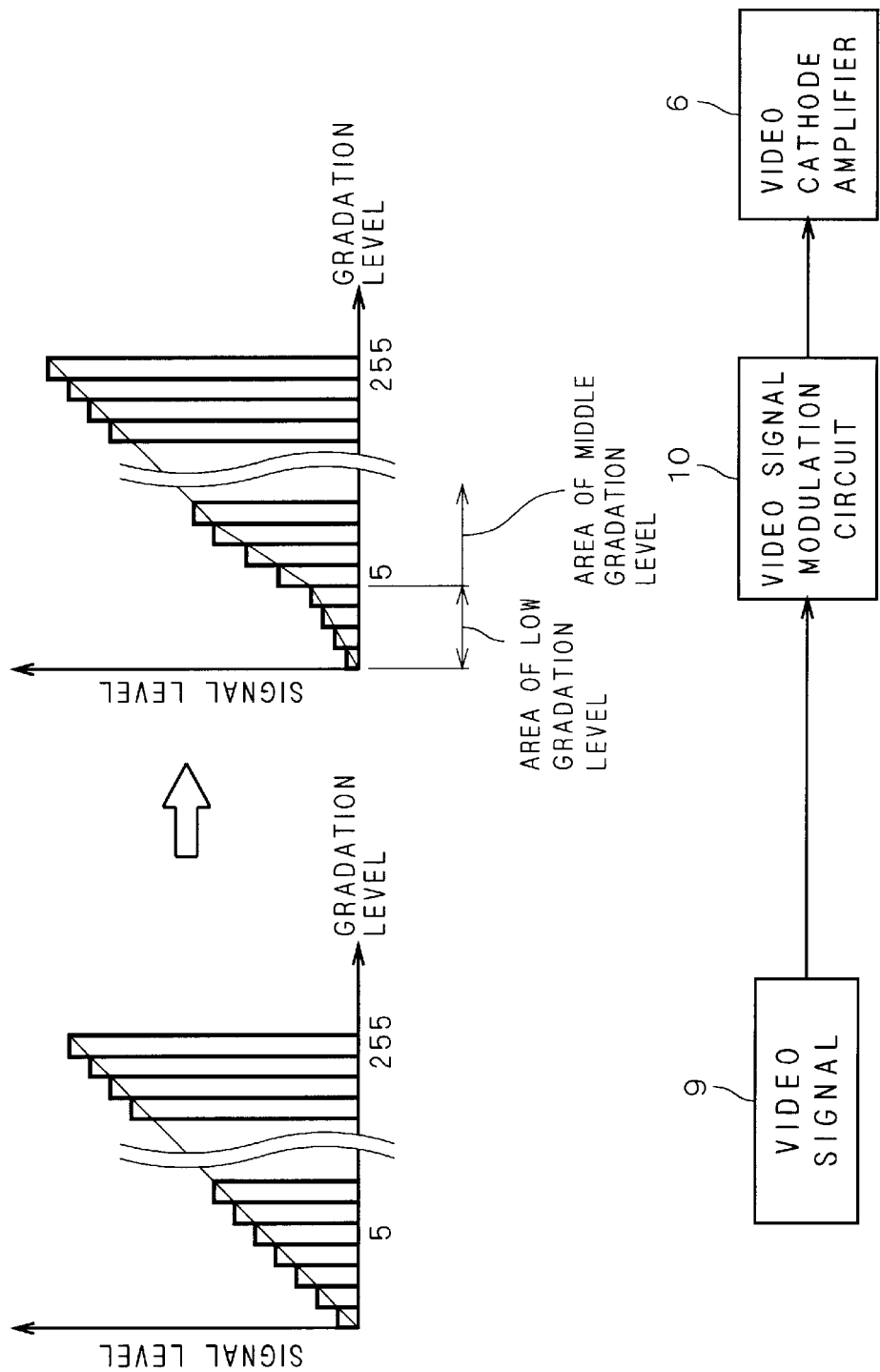
FIG. 3 is a view illustrating operations of a video signal modulation circuit of a CRT display device according to a second preferred embodiment of the present invention.

FIG. 3 is a view illustrating operations of the video signal modulation circuit 10 of the CRT display device according to the second preferred embodiment. The left graph of FIG. 3 shows the relation between the gradation level and the signal level according to the first video signal (video signal 9) to be inputted to the video signal modulation circuit 10. The right graph of FIG. 3 shows the relation between the gradation level and the signal level according to the second video signal to be outputted from the video signal modulation circuit 10. Similar to the first preferred embodiment, the video signal modulation circuit 10 in the second preferred embodiment converts the first video signal into the second video signal having a signal level to the gradation level in the area of low gradation level (black area) lower than the signal level of the first video signal. As described above, the second preferred embodiment is further directed to the effect that the boundary between signal level in the area of low gradation level and the signal level in the area of high gradation level according to the second video signal is smoothen and a rapid change in signal level is controlled.

More particularly, the proportionality constant of the signal level of the second video signal to the gradation level in the area of low gradation level is defined to be lower than the proportionality constant of the signal level of the first video signal to the gradation level, for example. Further, the proportionality constant in the area in the vicinity of the foregoing boundary is linearly interpolated at a certain inclination. FIG. 3 shows the example in which the video signal modulation circuit 10 defines, as the modulation in the area of low gradation level, the proportionality constant of the signal level to the gradation level within lower four levels of gradation to be lower than the proportionality constant of the signal level of the first video signal to the gradation level. The proportionality constants to the subsequent fifth and sixths gradation levels are defined to have such an inclination that there occurs interpolation between the signal level of the fourth gradation level from the low and the signal level of the seventh gradation level. The rapid change in signal level at the boundary between the area of low gradation level and the area of high gradation level can be suppressed accordingly. The numerical values employed here should not limited to the foregoing values. They may be changed according to the contents to be displayed by the video signal 9.

As described above, the CRT display device including the MM tube according to the second preferred embodiment realizes smoothing of the boundary between the area of low gradation level and the area of high gradation level in terms of the relation between the signal level and the gradation level according to the second video signal and control of rapid change at this boundary. As a result, display with a desired gradation level is allowed at this boundary and deterioration in image caused by the display with undesired gradation level is controlled.

In the second preferred embodiment, the proportionality constant in the area in the vicinity of the boundary between the area of low gradation level and the area of high gradation level is linearly interpolated, by the video signal modulation circuit 10 for suppressing rapid change in signal level at this boundary. However, the method of suppression should not be limited to this. Another method such as curved interpolation is applicable for suppressing rapid change in signal level in the vicinity of such boundary. It is clear that the same effects can be achieved by this method.

While the invention has been shown and described in detail, the foregoing description is in all aspects illustrative and not restrictive. It is therefore understood that numerous modifications and variations can be devised without departing from the scope of the invention.

What is claimed is:

1. A CRT display device, comprising:
    an electron gun having a cathode and first, second electrodes respectively including electron passing holes for drawing electrons from said cathode; and driving voltage generating means for generating a driving voltage for drawing electrons from said cathode, wherein a cathode voltage during cutoff ranges from 50 V to 80 V regarding a voltage of said first electrode as zero, following conditions among a diameter of said electron passing hole of said first electrode, a thickness of said first electrode at said electron passing hole, a diameter of said electron passing hole of said second electrode, a thickness of said second electrode at said electron passing hole and a distance between said first, second electrodes are satisfied:

thickness of first electrode at electron passing hole/ diameter of electron passing hole of first electrode $\leq 0.23$;

distance between first, second electrodes/diameter of electron passing hole of second electrode $\leq 0.53$; and thickness of second electrode at electron passing hole/ diameter of electron passing hole of second electrode $\leq 0.87$, and said driving voltage in an area having a gradation level lower than a predetermined gradation level is kept low in order to keep brightness in said area of said gradation level lower than said predetermined gradation level lower than real brightness of a first video signal to be inputted to said CRT display device.

2. The CRT display device according to claim 1, wherein said driving voltage is interpolated so that rapid change in voltage level at a boundary between said area of said gradation level lower than said predetermined gradation level and an area of a gradation level higher than said predetermined gradation level is suppressed.

3. The CRT display device according to claim 1, further comprising signal converting means for converting said first video signal into a second video signal having a gradation level which is kept lower than a gradation level of said first video signal in said area of said gradation level lower than said predetermined gradation level, wherein said driving voltage generating means generates said driving voltage on the basis of said second video signal.

4. The CRT display device according to claim 3, wherein said second video signal is interpolated so that rapid change in gradation level at a boundary between said area of said gradation level lower than said predetermined gradation level and an area of a gradation level higher than said predetermined gradation level is suppressed.

* * * * *